United States Patent
Chen et al.

(10) Patent No.: US 6,687,422 B1
(45) Date of Patent: Feb. 3, 2004

(54) DISCRETE IMAGE DATA INTERPOLATION USING SUB-UNITY SHIFT

(75) Inventors: Qin-Sheng Chen, Beachwood, OH (US); Martin S. Weinhous, Moreland Hills, OH (US)

(73) Assignee: The Cleveland Clinic Foundation, Cleveland, OH (US)

( * ) Notice: Subject to any disclaimer, the term of this patent is extended or adjusted under 35 U.S.C. 154(b) by 0 days.

(21) Appl. No.: 09/623,781

(22) PCT Filed: Feb. 16, 2000

(86) PCT No.: PCT/US00/03995

§ 371 (c)(1),
(2), (4) Date: Dec. 1, 2000

(87) PCT Pub. No.: WO00/49596

PCT Pub. Date: Aug. 24, 2000

(51) Int. Cl.$^7$ .................................................. G06K 9/32
(52) U.S. Cl. ..................... 382/300; 382/280; 345/606; 708/403
(58) Field of Search .................................. 382/276, 277, 382/278, 279, 280, 299, 300; 708/403, 404, 405; 345/606, 615

(56) References Cited

U.S. PATENT DOCUMENTS

| | | | | |
|---|---|---|---|---|
| 5,170,170 A | * | 12/1992 | Soumekh | 342/179 |
| 5,481,275 A | * | 1/1996 | Mical et al. | 345/698 |
| 5,566,284 A | * | 10/1996 | Wakayama | 345/587 |
| 5,917,940 A | * | 6/1999 | Okajima et al. | 382/173 |
| 6,178,271 B1 | * | 1/2001 | Maas, III | 382/294 |
| 6,181,135 B1 | * | 1/2001 | Shen | 324/309 |
| 6,456,745 B1 | * | 9/2002 | Bruton et al. | 382/298 |
| 6,507,859 B1 | * | 1/2003 | Omori et al. | 708/300 |

OTHER PUBLICATIONS

"Image Approximation by Variable Knot Bicubic Splines." Dennis G. McCaughey, and Harry C. Andrews, IEEE Transactions on Pattern Analysis and Machine Intelligence, vol. PAMI–3, No. 3, May 1981, pp. 299–310.

"Simple Algorithms and Architectures for B–Spline Interpolation." P.V. Sankar and L.A. Ferrari, IEEE Transactions on Pattern Analysis and Machine Intelligence, vol. 10, No. 2, Mar. 1988, pp. 271–276.

"Fast B–Spline Transforms for Continuous Image Representation and Interpolation." Michael Unser, Akram Aldroubi, Murray Eden, IEEE Transactions on Pattern Analysis and Machine Intelligence, vol. 13, No. 3, Mar. 1991, pp. 277–285.

"Quadratic Interpolation for Image Resampling." Neil A. Dodgson, IEEE Transactions on Image Processing, vol. 6, No. 9, Sep., 1997, pp. 1322–1326.

(List continued on next page.)

*Primary Examiner*—Samir Ahmed
*Assistant Examiner*—Anand Bhatnagar
(74) *Attorney, Agent, or Firm*—Ned Pejic; Calfee, Halter & Griswold, LLP

(57) ABSTRACT

A method for interpolating digital images is provided. An original digital image in the spatial domain is transformed into a frequency domain representation via a Fourier transform. The Fourier transform or frequency domain representation is then modified by phase shift terms corresponding to image shifts in the spatial domain with sub-unity distances matching the locations where the image values need to be restored. The original and the shifted images are then interspersed together, yielding an interpolated image. The method is particularly useful for two and three-dimensional computer tomography (CT) and magnetic resonance imaging (MRI) images, as well as other medical and non-medical digital images.

1 Claim, 3 Drawing Sheets

OTHER PUBLICATIONS

"Interpolation Using Wavelet Bases." Alex P. Pentland, IEEE Transactions on Pattern Analysis and Machine Intelligence, vol. 16, No. 4, Apr. 1994, pp. 410–414.

"A New Approach to the Interpolation of Sampled Data." C. Robert Appledorn, IEEE Transactions on Medical Imaging, vol. 15, No. 3, Jun. 1996, pp. 369–376.

"Fast Surface Interpolation Using Multiresolution Wavelet Transform." Ming–Haw Yaou and Wen–Thong Chang, IEEE Transactions on Pattern Analysis and Machine Intelligence, vol. 16, No. 7, Jul. 1994, pp. 673–688.

"Directional Interpolation for Magnetic Resonance Angiography Data." Mehran Moshfeghi, IEEE Transaction on Medical Imaging, vol. 12, No. 2, Jun. 1993, pp. 366–379.

"Shape–Based Interpolation of Tree–Like Structures in Three–Dimensional Images." W.E. Higgins, C. Morice, and E. L. Ritman, IEEE Transactions on Medical Imaging, vol. 12, No. 3, Sep. 1993, pp. 439–450.

"Shape–Based Interpolation of Multidimensional Grey–Level Images." George J. Grevera and Jayaram K. Udupa, IEEE Transactions on Medical Imaging, vol. 15, No. 6, Dec. 1996, pp. 881–890.

"Nonlinear Filtering Approach to 3–D Grey–Scale Image Interpolation." William E. Higgins, Christopher J. Orlick, and Brian E. Ledell, IEEE Transactions on Medical Imaging, vol. 15, No. 4, Aug. 1996, pp. 580–587.

"Convolution–Based Interpolation for Fast, High–Quality Rotation of Images." Michael Unser, Philippe Thévenaz, and Leonid Yaroslavsky, IEEE Transactions on Image Processing, vol. 4, No. 10, Oct. 1995, pp. 1371–1381.

"Sequential Linear Interpolation of Multidimensional Functions." James Z. Chang, Jan P. Allebach, and Charles A. Bouman, IEEE Transactions and Image Processing, vol. 6, No. 9, Sep. 1997, pp. 1231–1245.

"A Novel Approach for Multidimensional Interpolation." Xiaochuan Pan, IEEE Signal Processing Letters, vol. 6, No. 2, Feb. 1999, pp. 38–40.

"A Task–Specific Evaluation of Three–Dimensional Image Interpolation Techniques." George J. Grevera, Jayram K. Udupa, and Yukio Miki, IEEE Transactions of Medical Imaging, vol. 18, No. 2, Feb. 1999, pp. 137–143.

"Edge–Detector Resolution Improvement by Image Interpolation." Vishvjit S. Nalwa, IEEE Transactions on Pattern Analysis and Machine Intelligence, vol. PAMI–9, No. 3, May 1997, pp. 446–451.

* cited by examiner

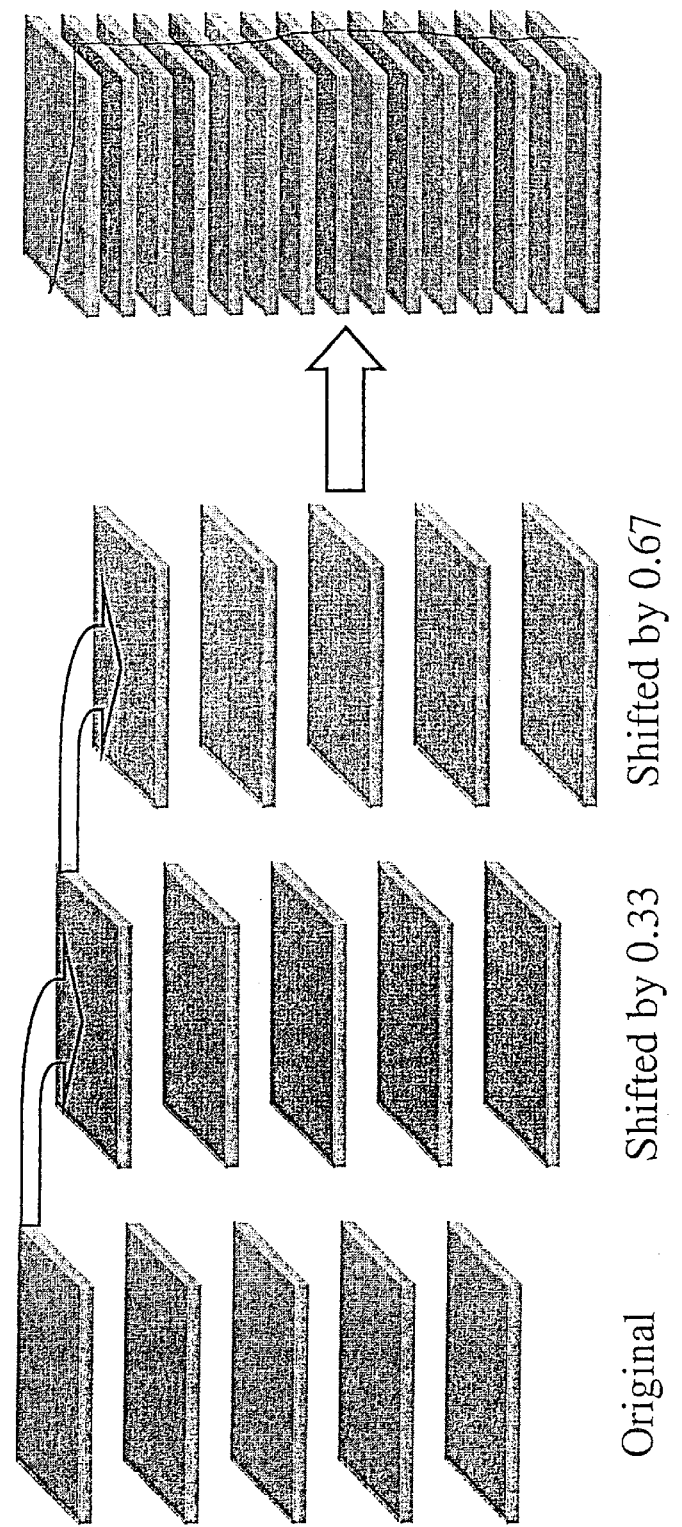

DISCRETE IMAGE DATA INTERPOLATION USING SUB-UNITY SHIFT

FIELD OF THE INVENTION

The invention relates generally to digital images and image processing and, more particularly, to a method of interpolating missing elements from originally sampled images and generating an interpolated image therefrom.

BACKGROUND OF THE INVENTION

With continuous improvements of imaging and computing technologies, more and more medical images are provided in digital form. Digital images can be easily manipulated on a computer to enhance or extract some properties which are clinically valuable, but may not be available with conventional images on films. In advanced radiotherapy treatment planning for instance, the computer tomography (CT) number in a voxel is used to determine the tissue attenuation which affects the radiation deposition in the tissue. In many clinical applications, such as visualization, quantitative measurements, and analysis, it is frequently necessary to interpolate an image so that different image properties can be explored.

Image interpolation is a process used to estimate the missing elements from the original sampling grid or image. If the sampling rate of a data set satisfies the Nyquist sampling criterion, the missing data in principle can be fully recovered by convoluting the discrete data with the continuous interpolating function (sinc function). Since the sinc function is an infinite function while digital images are always confined within a finite field, the interpolation can only be approximated. A major drawback in image implementation using the sinc function however is the computation efficiency.

In order to improve the computation efficiency with acceptable interpolation quality, different interpolation approaches have been developed. The most popular scheme is based on convolution techniques with selected kernels. The simplest kernel is the nearest-neighbor function, where the values of the interpolating points are copied from the nearest samples. Another widely used kernel is the first order polynomial function, where the value at an interpolating point is a linear combination of the adjacent samples. A major problem with these kernels is the unsatisfactory interpolation quality with staircase (i.e., blocky) artifacts in the resulting images. More complex kernels in this category are the quadratic and cubic spline functions. It has been showed that a spline function approximates a truncated version of the sinc function. Since a spline function is a piecewise continuous polynomial function, complexity and computing efficiency are the drawbacks. Improper selection of the spline function parameters may also significantly blur the resulting image. Alternatively, wavelet-based and Gaussian kernels have also been proposed. These can be summarized as attempts to improve the approximation of the truncated sinc function. Another class of image interpolation techniques is based on object connectivity and relative displacement. All of the aforementioned processing techniques suffer from the undesirable effects of long computation times and computational inefficiency that make these approaches impractical in routine clinical applications. Consequently, an image process method that does not suffer from such disadvantages is highly desirable.

SUMMARY OF THE INVENTION

According to one embodiment of the present invention, an image interpolation method based on a sub-unity coordinate shift technique is provided. In the approach, an original digital image in the spatial domain (e.g., Cartesian coordinate system (x,y)) is transformed into a frequency domain representation via a Fourier transform. The Fourier transform representation is then modified by phase shift terms corresponding to image shifts in the spatial domain with sub-unity distances matching the locations where the image values need to be restored. The original and the shifted images are then interspersed together, yielding an interpolated image. The present approach can achieve an interpolation quality as good as that with the sinc function since the sub-unity shift in Fourier domain is equivalent to shifting the sinc function in spatial domain, while the efficiency, thanks to the fast Fourier transform (FFT), is very much improved. In comparison to the conventional interpolation techniques such as linear or cubic B-spline interpolation, the interpolation accuracy is significantly enhanced. The method is especially applicable to two and three-dimensional computer tomography (CT) and magnetic resonance imaging (MRI) images, as well as other medical and non-medical digital images.

It is therefore an advantage of the present invention to provide a method for interpolating digital images to recover lost image data due to digitization.

It is a further advantage of this invention to provide a method for processing digital images that is computationally efficient.

It is yet a further advantage of the present invention to provide a method for processing digital images that is particularly suited to medical images such as, for example, computer tomography (CT) and magnetic resonance imaging (MRI).

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 3 is a diagram illustrating the sub-unity process of the present invention in the context of a 3 dimensional image.

DETAILED DESCRIPTION OF ILLUSTRATED EMBODIMENTS

Figure 1:
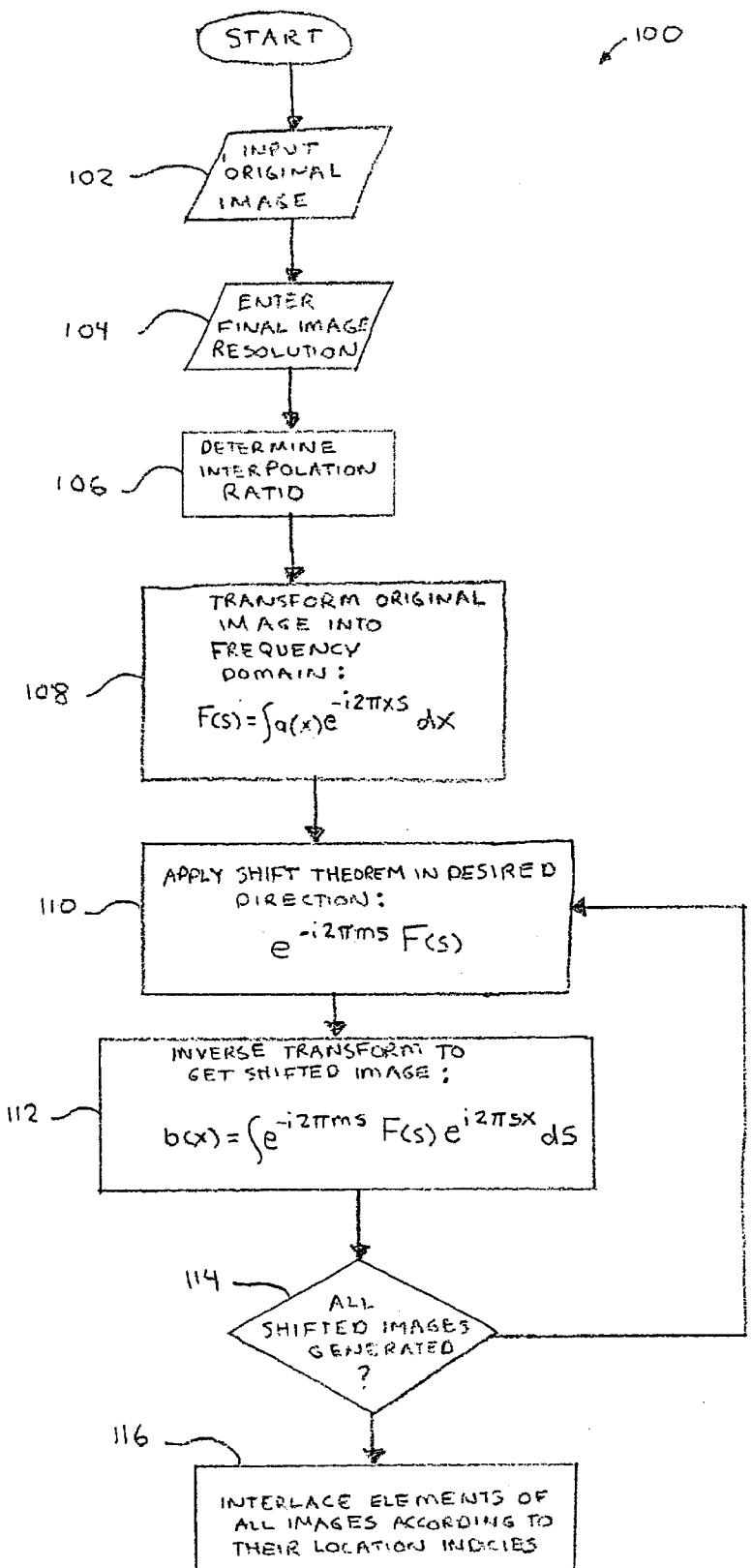
FIG. 1 is a flowchart of the logic of the present invention that can be implemented on a computer system.

The detailed description shall be made by way of reference to the drawing Figures and text herein. Prior to discussing the drawing figures, the present discussion shall focus on the several important principles of the present invention.

In this regard, a number of preliminary definitions shall be discussed. More specifically, the sets of integer numbers, real numbers, and complex numbers shall be denoted by Z, R and C respectively. Moreover, X ⊂ Y shall be defined as set X is a subset of set Y and $f:X \rightarrow Y$ shall be defined as a function f from a set X into a set Y. The Cartesian product, $X_1 x X_2 x \ldots x X_n$, of n independent sets shall also be defined as an n dimensional coordinate set. If all the sets are subsets of the set of real numbers, the product can be denoted in short by $R^n$. Given coordinate and value sets as subsets of the set of real numbers, $X \subset R^n$ where $n \in \{2,3\}$, and $L \subset R$, respectively, then an L valued image a on X is the graph of a function $a:X \rightarrow L$. Thus an L valued image a on X is of the form:

$$a=\{(x,a(x)):x \in X\} \quad (1)$$

where $a(x) \in L$. In this graph, $(x, a(x))$ represents an image element of the image a, where x is the pixel location and $a(x)$ the pixel value at location x. After digitization, the union of all the centers of the sampling cells, referred to as a sampling grid, is usually depicted by a set of integer numbers $x \in X \subset Z^n$, while the pixel values can be integer, real, or complex, $a(x) \in L \subset \{Z,R,C\}$.

In this regard, image interpolation is used to recover the missing image elements due to the process of digitization. If the discretization of the image field satisfies the Nyquest sampling criterion, the pixel value at any location inside the imaging field can be accurately determined. Let a denote a digital image acquired from an object or a scene. Given a set of parameters $m \in M \subset R^n$, characterizing the coordinate translation, the new pixel coordinate is a function, $y:X \times M \rightarrow Y$, where $Y \subset R^n$. Each pixel location $y \in Y$ can be calculated:

$$y=x-m \quad (2)$$

The pixel value which has lost in the process of digitization can be approximated by the present invention. If image a is finite and band limit, its Fourier transform $f:X \times S \rightarrow L$, where $S \subset R^n$ and $L \subset C$, exists:

$$F(s)=\int a(x)e^{-i2\pi xs}dx \quad (3)$$

Where, $F(s) \in L$ and $s \in S$. The shift theorem of the Fourier transformation states that if $a(x)$ has a Fourier transform $F(s)$, then $a(x-m)$ has the Fourier transform $e^{-i2\pi ms}F(s)$. On the other hand, one can multiply the Fourier transform of the original image by a phase term $e^{-i2\pi ms}$. The inverse Fourier transform of the product yields the shifted image $b:Y \rightarrow L$ from the original image a:

$$b(x)=\int e^{-i2\pi ms}F(s)e^{-i2\pi sx}ds \quad (4)$$

Since $e^{-i2\pi ms}F(s)$ is a real even and imaginary odd function, the resulting image reduces to a real function $b(x) \in L \subset R$.

If a digital image a, satisfies the Nyquest sampling criterion and its Fourier transform exists, the image values at any locations other than the sampling points can be uniquely determined with Equation (4). Suppose that N−1 shifted images, $a_2, a_3, \ldots$ and $a_N$, are obtained from $a_1$, retaining all the missing image elements. Image interpolation involves to re-organizing the image elements from the N images. In this regard, the interpolated image can be denoted by $h:X \rightarrow L$.

$$h=\{(x,h(x)):x \in X\} \quad (5)$$

where, the coordinate set is an ordered union of the coordinate sets of the N images, $X=\{X_1 \cup X_2 \cup X_3 \cup \ldots \cup X_N\} \subset R^n$, with the image elements interspersed in sequence, and the value set becomes the union of the value sets, $L=\{L_1 \cup L_2 \cup L_3 \cup \ldots \cup L_N\} \subset R$.

The above definitions describe a general approach to data interpolation according to the present invention utilizing sub-unity coordinate shift methods.

The present invention was implemented with an IDL graphics programming system from Research Systems Inc., of Boulder, Colo., on a SGI o2™ Workstation from Silicon Graphics Inc., of Mountain View, Calif., with a MIPS R5000 CPU running IRIX Version 6.3 in 128 MB RAM. As will be described, the present invention utilized several forward and backward Fourier transformations. The discrete implementation must be done with care to avoid artifacts due to signal discontinuities in both spatial and frequency domain. In some cases, it is helpful to window an image in spatial domain before the Fourier transformation if there are discontinuities between the opposite sides of the image field.

Referring now to FIG. 1, a flowchart 100 is shown illustrating the logic of the present invention. In particular, the logic commences with step 102 where an original image or grid is input in to the system. The image is preferably in the spatial domain, which can be defined by a Cartesian coordinate or other conventional coordinate system. In step 104, the final image resolution is entered, which is preferably greater than the original image resolution (e.g., 2 times magnification, etc.). In step 106, the interpolation ratio along each coordinate determined. For example, to expand a 2-D image on a 512×512 grid (i.e., pixel or voxel) to that on a 4096×4096 grid, the interpolation ratio is 8 in each direction. To interpolate the missing slices of a set of CT scans from 75 slices to 375 slices, the interpolation ratio is 5 in the longitudinal direction and 1 within the slice. The interpolation ratio determines how many shifted images need to be generated by the system. As for the 2-D example with an interpolation ratio of 8×8, 63 shifted images are needed.

In step 108, the original image is transformed, as described above via a Fourier Transform, from the spatial domain into a frequency domain representation of the image. If the image is not continuous from side to side, windowing of the image before the transformation may be required. In step 110, the Fourier transform of the original image is multiplied by a phase term $e^{-i2\pi ms}$ in the direction image is to be shifted, where m is the reciprocal of the interpolation ratio.

In step 112, an inverse Fourier transform is executed on the shifted frequency domain representation to generate a shifted spatial domain representation (i.e., image). The "real" portion of the inverse transform is a shifted version of the original image. Steps 110 and 112 are repeated until all the images covering all the missing points are obtained, as directed by step 114. For example, to interpolate a 2-D image from 256×256 grids to 512×512 grids, three shifted images are produced. The intervals of the shifts in pixels are: (0.5, 0.0), (0.0, 0.5), and (0.5, 0.5). Once all of the images have been generated, step 116 interlaces the elements of all the images following their location indices. The location indices are defined by the shift direction and amount (i.e., 0.5 shift in the vertical direction, etc.) The result is an interpolated version of the original image at the new resolution level.

Figure 2:
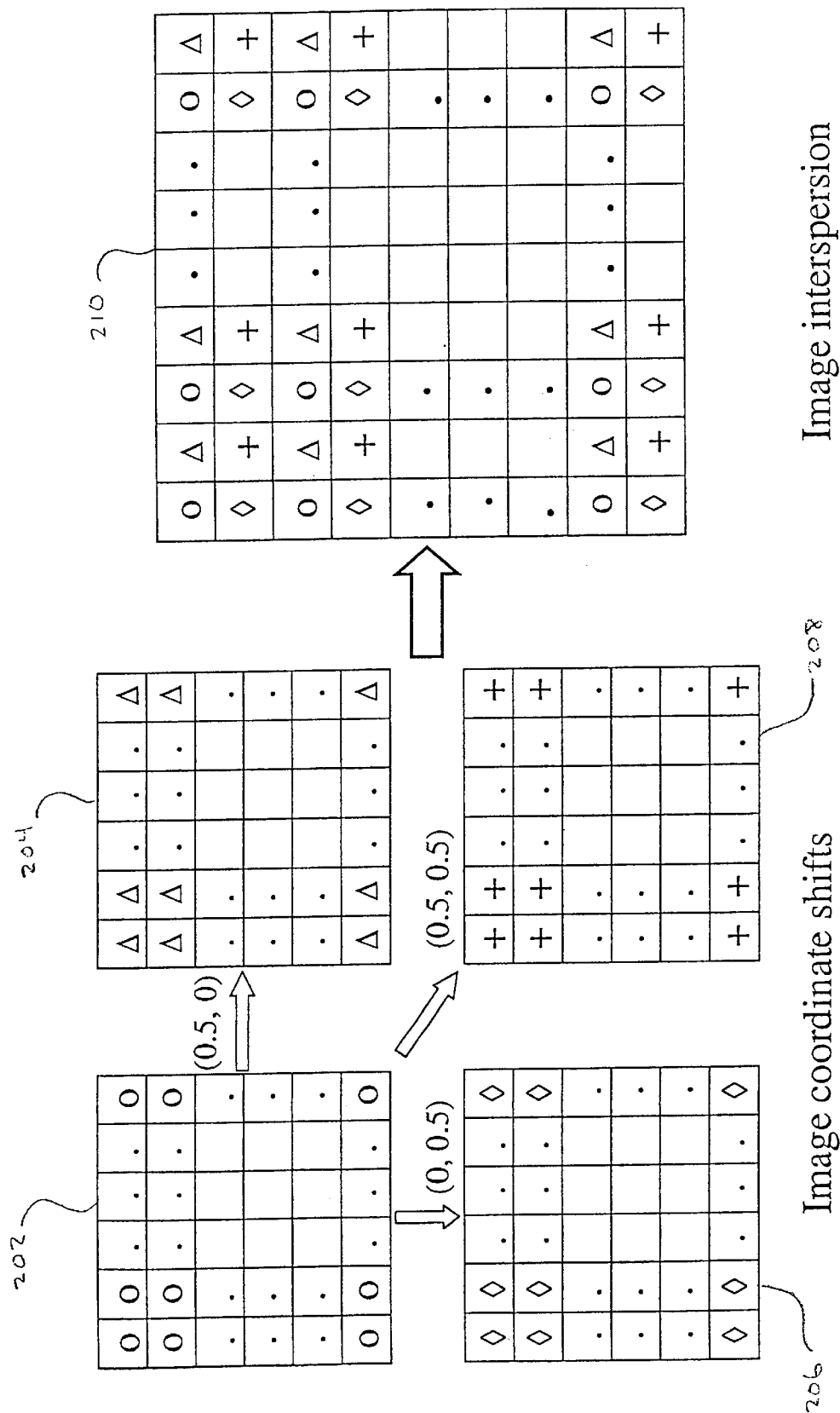
FIG. 2 is a diagram illustrating the a 2 dimensional image undergoing sub-unity shift process of the present invention.

FIG. 2 illustrates an example of how to interpolate a two-dimensional (2-D) image from an N×N grid to a 2N×2N grid. As described above, the original image 202 is first transformed into a frequency domain representation in the form of a Fourier transform. The Fourier transform is then multiplied by a phase term $e^{-i2\pi 0.5s}$ along the abscissa direction only, the ordinate direction only, and both the abscissa and the ordinate directions respectively, as represented by grids 204, 206, and 208. The inverse Fourier transforms of these three functions are three shifted images, as represented by grids 204, 206, and 208, by 0.5 pixels in the horizontal and the vertical directions, and by $0.5\sqrt{2}$ pixels in the diagonal direction respectively. Re-arranging the image elements yields an expanded or interpolated image, as shown by grid 210. In grid 210, the "○"s represent image elements of the original image, "Δ"s denote elements shifted by half a pixel of the original image in the horizontal direction, and "◇"s denoted elements shifted by half a pixel in the vertical direction, and "+"s denote elements shifted by 0.5√2 pixels in the diagonal direction (i.e., 0.5 in the vertical and 0.5 in the horizontal direction).

The present invention has been applied to X-ray computer tomography (CT) and magnetic resonance imaging (MRI), which can provide patient volumetric information in multiple slices. It is frequently required to interpolate the image slices, so that the image elements are isotropic. As shown in FIG. 3, this can be done by shifting the image as a set of 3-D volume data in the longitudinal direction with sub-unity distances of, for example, 0.33 voxels, and then interlacing the slices of the original and all the shifted images. Since the present method is based on a sub-unity shift, such shifts can range from greater than 0 to anywhere less than one, depending on the number of coordinate shifts desired.

While the present invention has been illustrated by the description of embodiments thereof, and while the embodiments have been described in considerable detail, it is not the intention of application to restrict or in any way limit the scope of the appended claims to such detail. Additional advantages and modifications will readily appear to those skilled in the art. For example, the present invention can be implemented on a general purpose Personal Computer or networked computer. Other possible medical images that can be analyzed by the present invention include ultrasound images and histological images. Additionally, the present invention may take the form of a computer-readable medium that has the logic or instructions necessary for instructing a computer to execute commands and processes according the present invention. Such computer readable mediums include, for example, magnetic disks, read-only memories (ROMs), programmable read-only memories (PROMs), electronically programmable read-only memories (EPROMs), electronically erasable programmable read-only memories, and compact-disk read-only memories (CD-ROMs). Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A method of generating an interpolated image comprising the steps of:

(a) reading at least one original digital image in the form of an original spatial domain representation;

(b) entering a final image resolution;

(c) determining an interpolation ratio based on the original digital image and the final image resolution;

(d) transforming the original spatial domain representation into a frequency domain representation;

(e) shifting the frequency domain representation by a shift value;

(f) transforming the frequency domain representation to a shifted spatial domain representation; and (g) interlacing the original spatial domain representation and the shifted spatial domain representation to arrive at an interpolated image.

* * * * *